United States Patent [19]

Sugimori

[11] 4,340,498
[45] Jul. 20, 1982

[54] HALOGENATED ESTER DERIVATIVES

[75] Inventor: Shigeru Sugimori, Yokohama, Japan

[73] Assignee: Chisso Corporation, Tokyo, Japan

[21] Appl. No.: 227,942

[22] Filed: Jan. 23, 1981

[30] Foreign Application Priority Data

Jan. 25, 1980 [JP] Japan .................................. 55-7539
Feb. 7, 1980 [JP] Japan .................................. 55-13889
Mar. 27, 1980 [JP] Japan .................................. 55-39202

[51] Int. Cl.³ .......................... C09K 3/34; G02F 1/13;
C07C 69/62; C07C 69/63; C07C 69/353;
C07C 69/635; C07C 69/75
[52] U.S. Cl. .......................... 252/299.5; 252/299.62;
252/299.63; 252/299.67; 350/350 R; 350/350
S; 560/8; 560/56; 560/59; 560/73; 560/100;
560/102; 560/106; 560/107; 560/118; 560/119
[58] Field of Search ...................... 252/299.62, 299.63,
252/299.67, 299.5; 350/350 R, 350 S; 560/8, 56,
59, 73, 100, 102, 106, 107, 118, 119

[56] References Cited

U.S. PATENT DOCUMENTS

| | | | |
|---|---|---|---|
| 3,979,321 | 9/1976 | Couttet et al. | 252/299.5 |
| 3,983,049 | 9/1976 | Aftercut et al. | 252/299.5 |
| 3,988,054 | 10/1976 | Yaguchi et al. | 252/299.5 |
| 3,989,639 | 11/1976 | Yaguchi et al. | 252/299.5 |
| 4,018,507 | 4/1977 | Raghavan | 252/299.5 |
| 4,027,950 | 6/1977 | Moriyama et al. | 252/299.5 |
| 4,122,026 | 10/1978 | Osman | 252/299.5 |
| 4,228,029 | 10/1980 | Osman | 252/299.5 |
| 4,229,315 | 10/1980 | Krause et al. | 252/299.63 |
| 4,256,656 | 3/1981 | Beguin et al. | 252/299.63 |
| 4,302,352 | 11/1981 | Eidenschink et al. | 252/299.5 |

FOREIGN PATENT DOCUMENTS

| | | | |
|---|---|---|---|
| 2522795 | 12/1975 | Fed. Rep. of Germany | 252/299.67 |
| 105701 | 5/1974 | German Democratic Rep. | 252/299.63 |
| 51-33785 | 3/1976 | Japan | 252/299.5 |
| 54-148184 | 11/1979 | Japan | 252/299.63 |
| 2028363 | 3/1980 | United Kingdom | 252/299.63 |

OTHER PUBLICATIONS

Gray, G. W. et al., Mol. Cryst. Liq. Cryst., vol. 37, pp. 157-188, (1976).
Destraoe, C. et al., Mol. Cryst. Liq. Cryst., vol. 68, pp. 175-181, (1981).

Primary Examiner—Teddy S. Gron
Attorney, Agent, or Firm—Fred Philpitt

[57] ABSTRACT

New halogenated ester derivatives and liquid crystal compositions containing the same are provided. The derivatives are expressed by the general formula

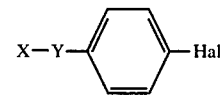

wherein X is

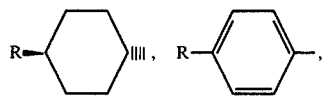

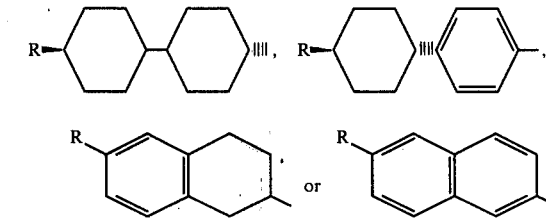

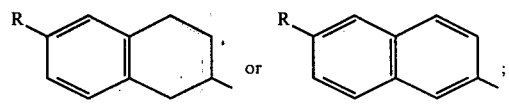

R is 1-15C alkyl group or alkoxy group; and Y is carboxyl group.

The derivatives are useful as component(s) of liquid crystal compositions which have higher mesomorphic temperature ranges, nevertheless have lower viscosities; and also have lower absolute values of dielectric anisotropy, nevertheless can be driven at lower voltages.

8 Claims, No Drawings

HALOGENATED ESTER DERIVATIVES

BACKGROUND OF THE INVENTION

1. Field of the Invention

This invention relates to new halogen-containing compounds, preferably fluorine-containing compounds, having a positive dielectric anisotropy, useful as components of liquid crystal compositions, and also it relates to liquid crystal compositions containing the same.

2. Description of the Prior Art

Display elements in which liquid crystals are incorporated have been widely used for clocks, electronic calculators, etc. These liquid crystal display elements utilize the optical anisotropy and dielectric anisotropy of liquid crystal substances, and liquid crystals include nematic ones, smectic ones and cholesteric ones. Among them, display elements utilizing nematic liquid crystals have been most widely employed practically, and include TN (twisted nematic) type, DS (dynamic scattering) type, guest-hot type, DAP type, etc. Specific features required for the liquid crystal substances vary depending on the respective types of display elements. Anyhow, however, the liquid crystal substances employed in these display elements are preferred to exhibit a liquid crystal phase within as broad a range as possible in the natural environment. But no single substance is now present which satisfies by itself the above-mentioned conditions, but it is the present status of the art that several kinds of liquid crystal substances or non-liquid crystal substances are mixed together to obtain substances which are fit for practical purpose for the present. Further, these substances must, of course, be stable against moisture, light, heat, air, etc. and also it is preferred that their threshold voltages and saturation voltages required for driving the display elements be as low as possible and their viscosities be also as low as possible for reducing the response time. Now, in order to extend the mesomorphic temperature ranges toward higher temperatures, it is necessary to employ liquid crystal substances having higher melting points as a component or components of liquid crystal composition, but such liquid crystal substances having higher melting points generally have higher viscosities; hence liquid crystal compositions containing the component(s) also have higher viscosities. Accordingly, liquid crystal display elements which are employable up to higher temperatures e.g. up to about 80° C. have had a tendency that their response times are retarded and notably retarded particularly at lower temperatures. Thus, liquid crystal substances having higher mesomorphic temperature ranges and nevertheless having lower viscosities have been desired. On the other hand, those having larger absolute values of dielectric anisotropy have generally been required. Because, by employing liquid crystal compositions having larger absolute values of dielectric anisotropy, it is generally possible to lower the drive voltage for display elements and also improve the response characteristics. Further, if liquid crystals which have no larger absolute values of dielectric anisotropy, nevertheless can effect drive at lower voltages are found, then it will be possible to further reduce power consumption for display elements; hence such liquid crystals are more desirable.

The present inventors have made broad researches for obtaining compounds satisfying these desires, and have found that certain kinds of halogen-containing compounds, particularly fluorine-containing compounds, satisfy such requirements.

SUMMARY OF THE INVENTION

One aspect of the present invention resides in: halogenated ester derivatives expressed by the general formula

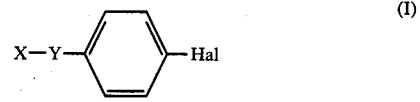

wherein X represents a group selected from the group consisting of

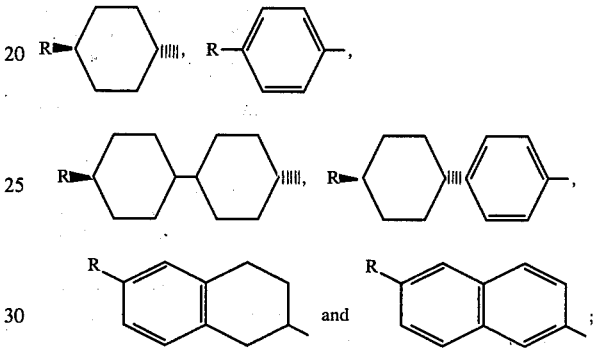

R represents an alkyl group or an alkoxy group, each having 1 to 15 carbon atoms; and Y represents carboxyl group.

Another aspect of the present invention resides in:
liquid crystal compositions comprising as at least one component thereof, a halogenated ester derivative or derivatives expressed by the above general formula (I).

The compounds of the general formula (I) have small values of dielectric anisotropy in the vicinity of $\Delta\epsilon = 1.5$, nevertheless they or liquid crystal compositions containing them as a component or components thereof have as low a threshold voltage as about 1.4 to 2.0 V to make drive at lower voltages possible. Thus, it is possible to produce display elements of small consumption of power by employing these compounds. Further, they have a sufficient stability against heat, light, humidity, electricity, etc. required as liquid crystals for display elements.

Next, the method for preparing the compounds of the present invention will be mentioned.

First in the case of halogenophenyl esters of carboxylic acids expressed by the general formula

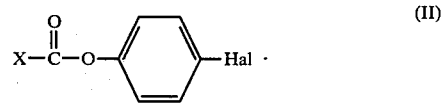

wherein X and Hal are the same as those defined above in the general formula (I), they can be obtained by reacting thionyl chloride with a carboxylic acid corresponding to the substituent X to prepare a carboxylic acid oxychloride which is then reacted with a 4-halogenophenol in the presence of pyridine.

Further, in the case of compounds expressed by the general formula

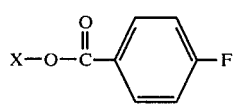

(VII)

wherein X represents

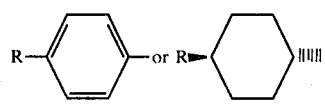

and R is the same as defined above in the formula (I), they can be obtained by first reacting thionyl chloride with 4-fluorobenzoic acid to prepare 4-fluorobenzoic acid oxychloride which is then reacted with a 4-substituted phenol or a trans-4-substituted cyclohexanol or the like corresponding to the aimed product, in the presence of pyridine.

As for compounds as obtained above, some of them are of nematic liquid crystals and others are of smectic ones and further there are compounds which do not constitute any liquid crystal by themselves. Anyhow, however, since they have a small dielectric anisotropy, it is possible to obtain liquid crystal display elements having a smaller dielectric anisotropy and also a lower drive voltage, when the above-mentioned compounds are combined with other liquid crystal compounds to prepare liquid crystal compositions. Such other liquid crystal compounds may be appropriately selected depending on types of display elements, uses, etc. Since the above-mentioned compounds are well compatible with other liquid crystal compounds, there is almost no restriction in this respect.

The compounds of the present invention will be further illustrated in detail by way of Examples showing the preparation examples of the compounds of the present invention expressed by the formula (I), the characteristic values of the compounds thus prepared and the characteristic values of liquid crystal compositions containing the above compounds.

EXAMPLE 1

[Preparation of 4'-fluorophenylesters of trans-4-substituted cyclohexanecarboxylic acids expressed by the formula

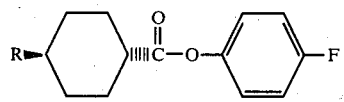

(IV)]

Thionyl chloride (10 ml) is added to trans-4-substituted cyclohexanecarboxylic acid (0.03 mol), and the mixture is heated on a water bath at 60° to 80° C. for 4 hours, after which the mixture becomes uniform and then allowed to stand further for one hour, followed by completely distilling off excess thionyl chloride under reduced pressure to leave an oily substance, which is trans-4-substituted cyclohexanecarboxylic acid oxychloride.

This oxychloride is then added with vigorous stirring to a solution of 4-fluorophenol (3.3 g) dissolved in pyridine (10 ml). The resulting reaction liquid is allowed to stand overnight and then added to water (100 ml), followed by extracting the resulting oily substance with toluene (100 ml). The resulting toluene layer is washed with 6 N HCl and then with 2 N NaOH and then washed with water till the layer becomes neutral. After filtration of the toluene layer, toluene is distilled off under reduced pressure. A remaining oily substance is recrystallized from ethanol to give the objective 4'-fluorophenyl ester of trans-4-substituted cyclohexanecarboxylic acid. The physical properties (transition points) and values of elemental analysis of a series of compounds obtained as above are shown in Table 1.

TABLE 1

| R in formula (IV) | Yield (g) | Yield (g) | Transition point M.P. or C—N point (°C.) | N—I point (°C.) | | Value of elemental analysis Observed (%) | Theoretical (%) |
|---|---|---|---|---|---|---|---|
| $C_3H_7$ | 6.1 | 77.0 | 48~48.7 | — | C | 72.5 | 72.7 |
| | | | | | H | 7.8 | 8.0 |
| $C_4H_9$ | 3.1 | 37.2 | 30.8~31.1 | — | C | 73.6 | 73.4 |
| | | | | | H | 8.4 | 8.3 |
| $C_5H_{11}$ | 3.6 | 41.1 | 25.9~26.0 | 23.1 | C | 74.1 | 73.9 |
| | | | | | H | 8.8 | 8.6 |
| $C_6H_{13}$ | 4.5 | 49.0 | 29.7~30.0 | 24.3 | C | 74.3 | 74.5 |
| | | | | | H | 8.7 | 8.9 |
| $C_7H_{15}$ | 5.9 | 61.5 | 29.1~29.3 | 33.2 | C | 75.2 | 75.0 |
| | | | | | H | 9.3 | 9.1 |
| $C_8H_{17}$ | 6.0 | 59.9 | 34.1~34.7 | 30.6 | C | 75.6 | 75.4 |
| | | | | | H | 9.1 | 9.3 |
| $C_6H_{13}O$ | 5.5 | 56.9 | 35.6~35.9 | — | C | 70.5 | 70.8 |
| | | | | | H | 8.8 | 8.4 |

EXAMPLE 2

[Preparation of 4'-fluorophenyl esters of 4-substituted benzoic acids expressed by

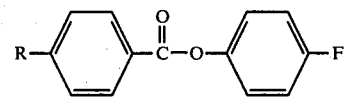

(V)]

Example 1 was repeated except that 4-substituted benzoic acids (0.03 mol) were substituted for trans-4-substituted cyclohexanecarboxylic acids in Example 1, to obtain 4'-fluorophenyl esters of 4-substituted benzoic acids. The physical properties and values of elemental analysis of these compounds are shown in Table 2.

TABLE 2

| R in formula (V) | Yield (g) | Yield (%) | Transition point M.P. or C—Sm point (°C.) | Sm→I point (°C.) | | Value of elemental analysis Observed (%) | Theoretical (%) |
|---|---|---|---|---|---|---|---|
| $C_3H_7$ | 4.5 | 58.1 | 48.1~49.4 | — | C | 74.8 | 74.4 |
| | | | | | H | 6.1 | 5.9 |
| $C_4H_9$ | 4.7 | 57.6 | 37.2~38.0 | — | C | 74.8 | 75.0 |
| | | | | | H | 6.5 | 6.3 |
| $C_5H_{11}$ | 4.2 | 48.9 | 32.9~33.8 | — | C | 75.8 | 75.5 |
| | | | | | H | 6.5 | 6.7 |
| $C_7H_{15}$ | 4.9 | 52.0 | 35.1~35.5 | — | C | 76.8 | 76.4 |
| | | | | | H | 7.2 | 7.4 |
| $C_8H_{17}$ | 5.1 | 51.8 | 41.7~42.8 | — | C | 76.9 | 76.8 |
| | | | | | H | 7.1 | 7.7 |
| $CH_3O$ | 5.7 | 77.2 | 56.1~57.4 | — | C | 68.9 | 68.3 |
| | | | | | H | 4.7 | 4.5 |

TABLE 2-continued

| R in formula (V) | Yield (g) | Yield (%) | Transition point M.P. or C—Sm point (°C.) | Sm→I point (°C.) | Value of elemental analysis Observed (%) | | Theoretical (%) |
|---|---|---|---|---|---|---|---|
| C₂H₅O | 5.5 | 70.5 | (60.8~61.6)* 70.5~71.3 (77.4)* | — | C H H | 69.8 5.1 5.1 | 69.2 5.0 5.0 |
| C₃H₇O | 5.9 | 71.8 | 81.1~82.2 | — | C H | 69.9 5.3 | 70.1 5.5 |
| C₄H₉O | 6.0 | 69.4 | 97.5~98.5 | — | C H | 70.6 6.2 | 70.8 5.9 |
| C₅H₁₁O | 6.0 | 66.2 | 66.5~68.1 | — | C H | 71.1 6.5 | 71.5 6.3 |
| C₆H₁₃O | 6.2 | 68.4 | 59.0~60.4 | 37.1 | C H | 72.3 6.9 | 72.1 6.7 |
| C₇H₁₅O | 7.0 | 70.7 | 64.6~66.1 | 40.6 | C H | 72.5 6.9 | 72.7 7.0 |
| C₈H₁₇O | 6.9 | 66.9 | 58.2~58.8 | 42.5 | C H | 73.0 7.5 | 73.2 7.3 |

*Value of a different crystalline form

EXAMPLE 3

[Preparation of 4″-fluorophenyl ester of 4-(trans-4′-pentylcyclohexyl)-benzoic acid expressed by the formula

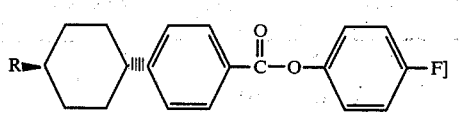

Example 1 was repeated except that 4-(trans-4′-pentylcyclohexyl)-benzoic acid (0.03 mol) was substituted for trans-4-substituted cyclohexanecarboxylic acids in Example 1, to obtain 4″-fluorophenyl ester of 4-(trans-4′-pentylcyclohexyl)-benzoic acid (7.5 g) (yield: 67.9%), which also was of a smectic liquid crystal and had a C-Sm point of 91.0°~93.3° C. and a Sm-I point of 159.0° C. Further, the values of elemental analysis were C: 79.9% (theoretical: 78.2%) and H: 7.8% (theoretical: 7.9%).

EXAMPLE 4

[Preparation of 4′-fluorophenyl esters of 6-substituted naphthalene-2-carboxylic acids expressed by the formula

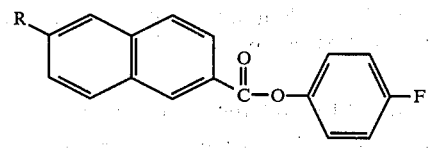

(X)]

Example 1 was repeated except that 6-substituted naphthalene-2-carboxylic acids (0.03 mol) were substituted for trans-4-substituted cyclohexanecarboxylic acids in Example 1, to obtain 4′-fluorophenyl esters of 6-substituted naphthalene-2-carboxylic acids. Their values of physical properties are shown in Table 3.

TABLE 3

| R in formula (X) | Yield (g) | Yield (%) | Transition point M.P. (°C.) | Sm—I point (°C.) |
|---|---|---|---|---|
| C₅H₁₁ | 5.1 | 50.6 | 83.3~89.2 | — |
| C₇H₁₅ | 5.0 | 45.8 | 67.0~69.0 | — |
| C₅H₁₁O | 6.2 | 72.9 | 97.7~100.0 | — |
| C₈H₁₇O | 6.5 | 55.0 | 74.0~76.3 | 70.0 |

EXAMPLE 5

[Preparation of 4′-fluorophenyl esters of 6-substituted-1,2,3,4-tetrahydronaphthalene-2-carboxylic acids expressed by the formula

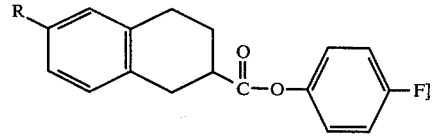

Example 1 was repeated except that 6′-substituted-1,2,3,4-tetrahydronaphthalene-2-carboxylic acids (0.03 mol) were substituted for trans-4-substituted cyclohexanecarboxylic acids in Example 1, to obtain 4′-fluorophenyl esters of 6-substituted-1,2,3,4-tetrahydronaphthalene-2-carboxylic acids. In the case of R=C₅H₁₁ in the above formula, the resulting product was obtained with a yield of 5.5 g (53.9%) and had a m.p. of 77.0°~78.6° C., and in the case of R=C₇H₁₅, the yield was 6.1 g (55.3%) and the m.p. was 58.6°~59.7° C.

EXAMPLE 6

[Preparation of 4″-halogenophenyl esters of trans-4-(trans-4′-substituted cyclohexyl)-cyclohexanecarboxylic acids expressed by the formula

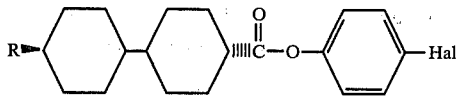

Thionyl chloride (10 ml) was added to trans-4-(trans-4′-substituted cyclohexyl)-cyclohexanecarboxylic acid (0.02 mol), followed by heating at a temperature of 60° to 80° C. It takes about one hour till the mixture becomes uniform. It is further heated for about 30 minutes to one hour, followed by distilling off excess thionyl chloride under reduced pressure. The resulting remaining oily substance corresponds to trans-4-(trans-4′-substituted cyclohexyl)-cyclohexanecarboxylic acid oxychlorides, which are then added to a solution of a 4-halogenophenol (0.2 mol) in pyridine (10 ml). The resulting reaction mixture is sufficiently agitated and allowed to stand overnight, followed by adding toluene (100 ml), washing the resulting toluene layer first with 6 N hydrochloric acid, then with 2 N sodium hydroxide solution and finally with water till it becomes neutral, with a separating funnel, drying over anhydrous sodium sulfate and distilling off toluene under reduced pressure. The resulting precipitated crystals are recrystallized from ethanol (200 ml) to obtain compounds expressed by the formula (XI) as the objective products. Their yields, physical properties (transition points) and values of elemental analysis are shown in Table 4.

TABLE 4

| In formula (XI) R | Hal | Amount of raw material carboxylic acid used (g) | Amount of halogenophenol used (g) | Yield (g) | Yield (%) | Transition point C—N point (°C.) | Transition point N—I point (°C.) | Value of elemental analysis | Observed (%) | Theoretical (%) |
|---|---|---|---|---|---|---|---|---|---|---|
| $C_3H_7$ | F | 5 | 2.2 | 4.0 | 58 | 69.4~70.5 | 183.1 | C | 76.1 | 76.3 |
|  |  |  |  |  |  |  |  | H | 8.8 | 9.0 |
| $C_7H_{15}$ | F | 6.1 | 2.2 | 4.0 | 5.0 | 73.7~74.3 | 170.1 | C | 77.2 | 77.6 |
|  |  |  |  |  |  |  |  | H | 9.9 | 9.8 |
| $C_3H_7$ | Cl | 5 | 2.6 | 4.5 | 62 | 82.4~82.8 | 214.9 | C | 72.9 | 72.8 |
|  |  |  |  |  |  |  |  | H | 8.5 | 8.6 |
|  |  |  |  |  |  |  |  | Cl | 9.7 | 9.8 |
| $C_7H_{15}$ | Cl | 6.1 | 2.6 | 4.7 | 54 | 86.0~87.2 | 196.8 | C | 74.4 | 74.5 |
|  |  |  |  |  |  |  |  | H | 9.6 | 9.4 |
|  |  |  |  |  |  |  |  | Cl | 8.5 | 8.5 |

EXAMPLE 7

[Preparation of 4'-substituted phenyl esters of 4-fluorobenzoic acids (VIII)]

Thionyl chloride (7 ml) is added to 4-fluorobenzoic acid (2.8 g) (0.02 mol), and the mixture is heated on a water bath at 60° to 80° C. for 4 hours, after which the mixture becomes uniform and is then allowed to stand further for one hour, followed by completely distilling off excess thionyl chloride. The resulting remaining oily substance corresponds to 4-fluorobenzoic acid oxychloride, which is added with vigorous stirring to a solution of a 4-substituted phenol (0.02 mol) in pyridine (7 ml). The resulting reaction liquid is allowed to stand overnight, and then added to 100 ml of water, followed by extracting the resulting oily substance with 100 ml of toluene. The resulting toluene layer is washed with 6 N HCl, then with 2 N NaOH and further with water till it becomes neutral, followed by filtration and distilling off toluene under reduced pressure. The resulting remaining oily substance is recrystallized from ethanol to obtain a 4'-substituted phenyl ester of 4-fluorobenzoic acid. Their values of phisical properties and values of elemental analysis are shown in Table 5.

TABLE 5

| R in formula (VIII) | Yield (g) | Yield (%) | M.P. (°C.) | Value of elemental analysis Observed (%) | Theoretical (%) |
|---|---|---|---|---|---|
| $CH_3O$ | 3.6 | 73.2 | 86.6~87.0 | C 68.1 | 68.3 |
|  |  |  |  | H 4.2 | 4.5 |
| $C_2H_5O$ | 3.9 | 75.0 | 84.8~85.3 | C 70.0 | 69.2 |
|  |  |  |  | H 4.8 | 5.0 |
| $C_3H_7O$ | 3.6 | 65.7 | 73.3~74.0 | C 69.9 | 70.1 |
|  |  |  |  | H 5.6 | 5.5 |
| $C_4H_9O$ | 4.2 | 72.9 | 73.0~73.2 | C 70.5 | 70.8 |
|  |  |  |  | H 6.0 | 5.9 |
| $C_5H_{11}O$ | 4.1 | 67.9 | 67.0~67.5 | C 71.1 | 71.5 |
|  |  |  |  | H 6.4 | 6.3 |
| $C_6H_{13}O$ | 4.9 | 77.5 | 64.8~65.1 | C 72.3 | 72.1 |
|  |  |  |  | H 6.6 | 6.7 |
| $C_7H_{15}O$ | 5.3 | 80.3 | 74.8~75.7 | C 72.5 | 72.7 |
|  |  |  |  | H 7.1 | 7.0 |
| $CH_3$ | 2.9 | 54.3 | 74.8~75.4 |  |  |
| $C_2H_5$ | 3.1 | 63.5 | 51.1~52.1 |  |  |
| $C_3H_7$ | 3.5 | 67.8 | 30.0~31.0 |  |  |
| $C_4H_9$ | 3.7 | 55.1 | 46.7~47.7 |  |  |
| $C_5H_{11}$ | 4.0 | 69.9 | 35.2~36.2 |  |  |
| $C_6H_{13}$ | 4.3 | 71.7 | 42.3~42.8 |  |  |
| $C_7H_{15}$ | 4.5 | 71.7 | 42.3~43.3 |  |  |

EXAMPLE 8

[Preparation of trans-4'-substituted cyclohexyl esters of 4-fluorobenzoic acid (IX)]

Example 7 was repeated except that trans-4-substituted cyclohexanols (0.02 mol) were substituted for 4-substituted phenols in Example 7, to obtain trans-4'-substituted cyclohexyl esters of 4-fluorobenzoic acid. Their values of physical properties and values of elemental analysis are shown in Table 6.

TABLE 6

| R in formula (IX) | Yield (g) | Yield (%) | M.P. (°C.) | Value of elemental analysis Observed (%) | Theoretical (%) |
|---|---|---|---|---|---|
| $C_3H_7$ | 3.1 | 58.9 | 45.0~45.5 | C 72.9 | 72.7 |
|  |  |  |  | H 7.9 | 8.0 |
| $C_4H_9$ | 2.2 | 39.7 | 23.0~24.3 | C 73.5 | 73.4 |
|  |  |  |  | H 7.9 | 8.3 |
| $C_7H_{15}$ | 2.6 | 40.6 | 36.0~36.7 | C 75.2 | 75.0 |
|  |  |  |  | H 9.3 | 9.1 |

EXAMPLE 9 (Application example 1)

A liquid crystal composition consisting of

| | |
|---|---|
| 4'-fluorophenyl ester of trans-4-pentylcyclohexanecarboxylic acid | one part, |
| 4'-fluorophenyl ester of trans-4-hexylcyclohexanecarboxylic acid | one part, and |
| 4'-fluorophenyl ester of trans-4-heptylcyclohexanecarboxylic acid | 3 parts, | has a N-I point of 29.4° C. and a $\Delta\epsilon$ of +1.4. The characteristic properties of this composition were measured at 25° C. in a cell of 10 μm thick provided with tin oxide transparent electrodes each coated with silicon oxide and subjected to rubbing treatment. Its threshold voltage and saturation voltage were 1.8 V and 2.6 V, respectively.

EXAMPLE 10 (Application example 2)

A liquid crystal composition consisting of

| | |
|---|---|
| 4'-fluorophenyl ester of trans-4-pentylcyclohexanecarboxylic acid | one part, |
| 4'-fluorphenyl ester of trans-4-hexylcyclohexanecarboxylic acid | one part, and |
| 4'-fluorophenyl ester of trans-4-heptylcyclohexanecarboxylic acid | 4 parts | has a N-I point of 30.0° C. and a Δε of 1.51. The characteristic properties were measured in the same manner as in Application example 1. Its threshold voltage and saturation voltage at 25° C. were 1.44 V and 2.12 V, respectively, and its rise time and decay time at 3 V and 32 Hz were 140 m sec. and 160 m sec., respectively. Further its threshold voltage and saturation voltage at 15° C. were 1.91 V and 2.74 V, respectively.

EXAMPLE 11 (Application example 3)

A liquid crystal mixture A consisting of

| | | |
|---|---|---|
| 4-pentyl-4'-cyanobiphenyl | 45%, | |
| 4-heptyl-4'-cyanobiphenyl | 29%, | (Mixture A) |
| 4-octyloxy-4'-cyanobiphenyl | 15%, and | |
| 4-pentyl-4''-cyanoterphenyl | 11%, | | has a N-I point of 63.3° C., a Δε of 12.4 and a viscosity at 20° C. of 60 cp. Its threshold voltage and saturation voltage at 25° C. were measured under the same conditions as in Application example 1 to give 1.65 V and 2.31 V, respectively. A liquid crystal composition obtained by adding 4'-fluorophenyl ester of 4-butylbenzoic acid (20 parts) of the present invention to the above liquid crystal mixture A (80 parts), had a lowered N-I point of 44° C. and a lowered Δε of 11.6° C., nevertheless had lowered actuation voltages (threshold voltage: 1.31 V, saturation voltage: 1.91 V), and also had a lowered viscosity at 20° C. of 50 cp.

EXAMPLE 12 (Application example 4)

A liquid crystal mixture obtained by adding 4'-fluorophenyl ester of 4-hexyloxybenzoic acid (20 parts) to the liquid crystal mixture A (80 parts) described in Application 3 had a N-I point of 48.6° C., a Δε of 11.7 and a viscosity at 20° C. of 45 cp. Its threshold voltage and saturation voltage were measured under the same conditions as in Application 3 to give 1.45 V and 2.02 V, respectively, which were lower than those of the mixture A.

EXAMPLE 13 (Application example 5)

A liquid crystal composition obtained by adding 4''-fluorophenyl ester of 4-(trans-4'-pentylcyclohexyl)benzoic acid (10 parts) to the liquid crystal mixture A (90 parts) described in Application example 3 had a N-I point of 70.2° C., a Δε of 12.1 and a viscosity at 20° C. of 60 cp. Its threshold voltage and saturation voltage measured under the same conditions as in Application example 3 were 1.77 V and 2.56 V, respectively.

EXAMPLE 14 (Application example 6)

A liquid crystal composition was prepared which consisted of

| | |
|---|---|
| trans-4-propyl-(4'-cyanophenyl)-cyclohexane | 16%, |
| trans-4-pentyl-(4'-cyanophenyl)-cyclohexane | 16%, |
| 4'-fluorphenyl ester of trans-4-pentyl-cyclohexanecarboxylic acid (R = C$_5$H$_{11}$ in formula (IV)) | 12%, |
| 4'-fluorphenyl ester of trans-4-hexylcyclohexanecarboxylic acid (R = C$_6$H$_{13}$ in formula (IV)) | 4%, |
| 4'-fluorphenyl ester of trans-4-heptylcyclohexanecarboxylic acid (R = C$_7$H$_{15}$ in formula (IV)) | 12%, |
| 4'-fluorophenyl ester of trans-4-(trans-4'-propylcyclohexyl)-cyclohexanecarboxylic acid (R = C$_3$H$_7$ in formula (VI)) | 20%, and |
| 4''-fluorophenyl ester of trans-4-(trans-4'-heptylcyclohexyl)-cyclohexanecarboxylic acid (R = C$_7$H$_{15}$ in formula (VI)) | 20%. |

Its nematic temperature range was measured to give −5° to +81° C. Further it had a viscosity at 20° C. of 19.2 cp and a dielectric anisotropy of +6.4. This liquid crystal composition was sealed in a cell composed of two glass bases each furnished with a tin oxide transparent electrode coated with silicon oxide and subjected to rubbing treatment, and spaced at an electrode distance of 10 μm. The composition was then subjected to measurement of its characteristic properties at 25° C. to give a threshold voltage of 1.96 V and a saturation voltage of 2.70 V. Further, when its rise time and decay time at 25° C. were measured employing a square wave of 32 Hz, 5 V, they were as short as 36 m sec. and 47 m sec., respectively. Even at 0° C., they were as good as 94 m sec. and 220 m sec., respectively.

EXAMPLE 15 (Application example 7)

The above-mentioned mixture A in Application example 3, i.e., a liquid crystal mixture consisting of

| | |
|---|---|
| 4-pentyl-4'-cyanobiphenyl | 45%, |
| 4-heptyl-4'-cyanobiphenyl | 29%, |
| 4-octyloxy-4'-cyanobiphenyl | 15%, and |
| 4-pentyl-4''-cyanoterphenyl | 11%, |
| (NI point: 63.3° C. dielectric anisotropy: +12.4), | | was sealed in a cell of 10 μm thick, composed of two bases, each furnished with a tin oxide transparent electrode coated with silicon oxide and subjected to rubbing treatment. The characteristic properties of this liquid crystal cell were measured at 25° C. to give a threshold voltage of 1.65 V and a saturation voltage of 2.31 V. A mixture of this mixture A (80 parts) with trans-4-heptylcyclohexyl ester of p-fluorobenzoic acid of the present invention (20 parts) had a lowered N-I point of 51.5° C. and a lowered dielectric anisotropy of +8.3. Nevertheless its threshold voltage and saturation voltage measured under the same conditions as in the previous case were also reduced down to 1.54 V and 2.15 V, respectively.

EXAMPLE 16 (Application example 8)

A mixture of the mixture A in Application example 7 (80 parts) with p'-pentyloxyphenyl ester of p-fluorobenzoic acid of the present invention (20 parts) had a N-I point of 54.7° C. and a dielectric anisotropy of +10.8. Nevertheless its threshold voltage and saturation voltage measured under the same conditions as in Application example 7 were reduced down to 1.52 V and 2.10 V, respectively.

EXAMPLE 17 (Application example 9)

A mixture of the mixture A in Application example 7 (80 parts) with p'-hexylphenyl ester of p-fluorobenzoic acid of the present invention (20 parts) has a N-I point of 48.0° C. and a dielectric anisotropy of +10.1. Nevertheless its threshold voltage and saturation voltage measured under the same conditions as in the previous case were reduced down to 1.43 V and 2.0 V, respectively.

What is claimed is:

1. In a liquid crystalline admixture, the improvement wherein at least one component of said admixture is a halogenated ester derivative expressed by the general formula

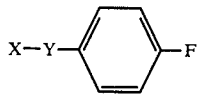 (I)

wherein X represents a group selected from the group consisting of

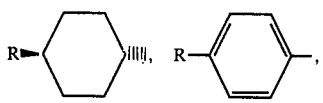

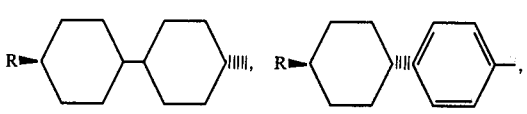

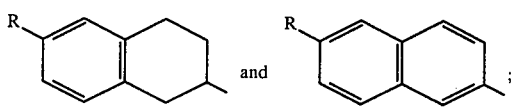

R represents an alkyl group or an alkoxy group, each having 1 to 15 carbon atoms; and Y represents carboxyl group the symbol ► and the symbol ||||| being in a trans-configuration relative to cyclohexane or bicyclohexane ring.

2. Halogenated ester derivatives according to claim 1 wherein said —Y— in said general formula is

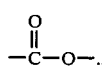

3. The admixture according to claim 2 wherein said X—Y— in said general formula is

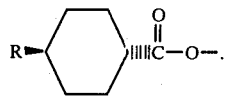

4. The admixture according to claim 2 wherein said X—Y— in said general formula is

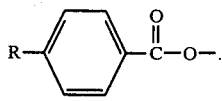

5. The admixture according to claim 2 wherein said X—Y— in said general formula is

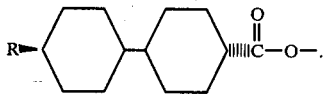

6. The admixture according to claim 1 wherein said X— in said general formula is

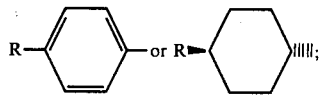

said Y— is

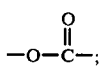

7. The admixture according to claim 6 wherein said X—Y— in said general formula is

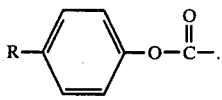

8. The admixture according to claim 6 wherein said X—Y— in said general formula is

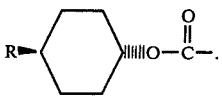

* * * * *